United States Patent
Kurihara et al.

[11] Patent Number: 5,946,061
[45] Date of Patent: Aug. 31, 1999

[54] FIXTURE AND FIXING METHOD OF LCD PANEL

[75] Inventors: Mikio Kurihara; Tohru Tsunekawa; Masayuki Morimoto, all of Kanagawa-ken, Japan

[73] Assignee: International Business Machines Corporation, Armonk, N.Y.

[21] Appl. No.: 09/074,939

[22] Filed: May 8, 1998

[30] Foreign Application Priority Data

Jun. 9, 1997 [JP] Japan ................................ 9-151295

[51] Int. Cl.[6] ............................................. G02F 1/1333
[52] U.S. Cl. ............................................................ 349/58
[58] Field of Search ................................ 349/58, 59, 60; 248/917; 348/838; 359/FOR 125

[56] References Cited

U.S. PATENT DOCUMENTS 4,488,772  12/1984  Georgopulos et al. .................. 349/58
5,436,745  7/1995   Voisin et al. ............................. 349/58
5,680,183  10/1997  Sasuga et al. ........................... 349/58
5,729,310  3/1998   Horiuchi et al. ......................... 349/58
5,815,224  9/1998   Hasegawa et al. ...................... 349/58

Primary Examiner—William L. Sikes
Assistant Examiner—James Dudek
Attorney, Agent, or Firm—Scully, Scott, Murphy & Presser; Jay P. Sbrollini

[57] ABSTRACT

A fixing method where no dead space occurs when a liquid crystal panel is fixed to the main body cover of a liquid crystal display unit, enhancing mechanical fixing strength with relatively simpler structure. The present invention is directed to a liquid crystal display unit comprising a liquid crystal panel with a display portion and a plurality of side surfaces mounted thereon through a support body fixed to a main body cover. The liquid crystal panel is provided with a plurality of protrusions on each of the plurality of side surfaces. The protrusions each have a flat surface. A plurality of spaces are each provided between the flat surface and the side surface. The support body is fitted into the spaces formed in the liquid crystal panel.

13 Claims, 6 Drawing Sheets

Fig. 3
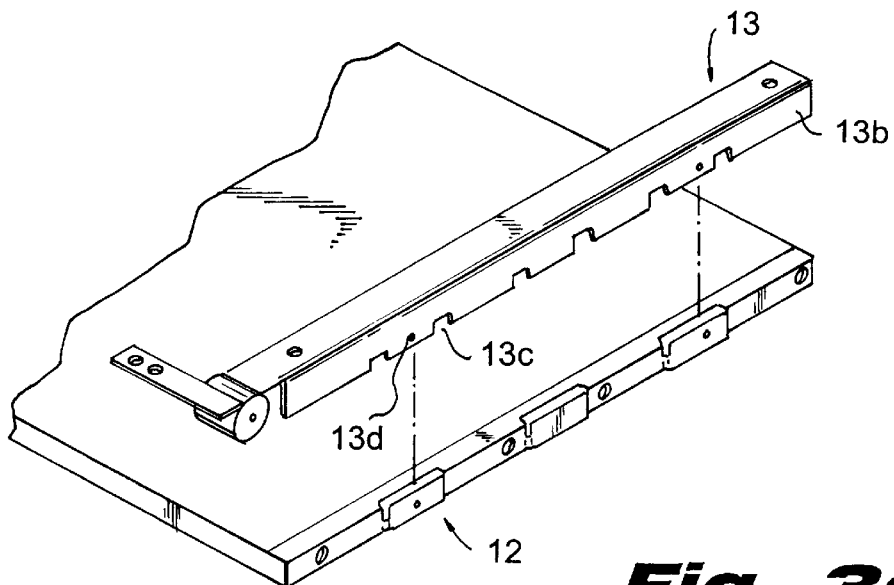
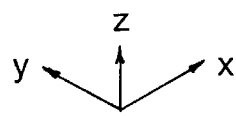
Fig. 3a
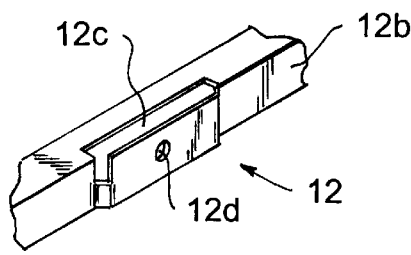
Fig. 4
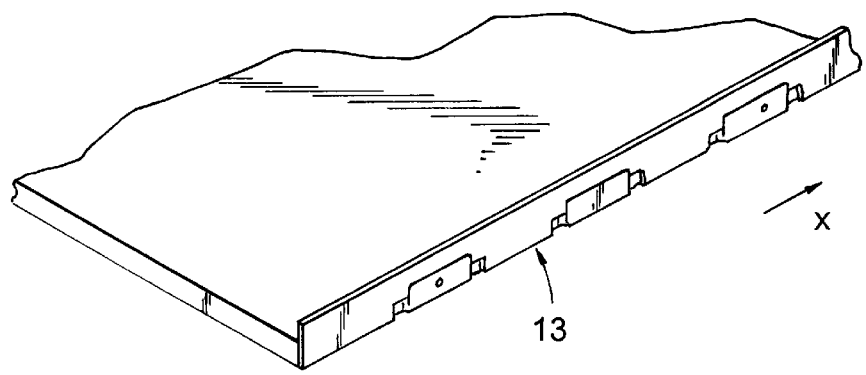

FIXTURE AND FIXING METHOD OF LCD PANEL

BACKGROUND OF THE INVENTION

1. Technical Field

The present invention relates to liquid crystal panels and liquid crystal display units, and more particularly to a mechanism for fixing a liquid crystal panel to a liquid crystal display unit such as a notebook type personal computer (hereinafter referred to as a PC).

2. Prior Art

Generally, in the case where a liquid crystal panel is fixed to the main cover of a PC with screws, they are fixed together by employing screws at the four corners of the liquid crystal panel in the direction perpendicular to the display screen. FIG. 1 is a top view showing a conventional liquid crystal panel fixed by screws. Since the liquid crystal panel is fixed by inserting screws into the upper surface thereof (i.e., in a direction perpendicular to a paper surface), spaces must be ensured for flanges into which screws are inserted and for screw heads. In the case where flanges for screws protrude from a liquid crystal panel, there is the fear that the four corner spaces for the flanges will be dead spaces.

Recently, in some PCS, the liquid crystal panel is fixed to the main body cover by inserting screws into screw holes provided directly in the side surfaces of the liquid crystal panel. In such products, dead space such as that shown in FIG. 1 will not occur, because screws are employed in a horizontal direction relative to the display surface and the aforementioned flanges for screws are not required. However, since screws are inserted directly into the side surfaces of the liquid crystal panel, a space for the depth of screw insertion has to be ensured interiorly of the liquid crystal panel. In the space for screw insertion, panel interior circuitry cannot be disposed, so it will be dead space.

In the aforementioned methods, the fixation of the liquid panel is performed by employing only screws, so a great load is concentrated only on the portions into which screws are inserted. For this reason, when a great shock is given to a PC, there is the possibility that the screwed portion of the liquid crystal panel will be damaged (for example, deformation of a screw hole and a screw itself). Therefore, there is a high demand for obtaining a fixing method which can enhance mechanical fixing strength.

It is therefore an object of the present invention to provide a novel method for fixing a liquid crystal panel to a liquid crystal display unit.

Another object of the present invention is to reduce the space required for fixation.

Still another object of the present invention is to enhance mechanical fixing strength by relatively simpler fixing structure.

SUMMARY OF THE INVENTION

To solve the aforementioned problems, there is provided a liquid crystal panel comprising: a display portion; and a plurality side surfaces each provided with a protrusion; wherein the protrusion has a flat surface and a space is provided between the flat surface and the side surface.

The flat surface of the protrusion may have a recess. The recess may be a through hole. The through hole may be a screw hole. The protrusion preferably comprises a plurality of protrusions for one of the side surfaces of the liquid crystal panel.

In addition, in order to achieve the aforementioned objects, there is provided a liquid crystal display unit comprising: a liquid crystal panel with a display portion and a plurality of side surfaces mounted thereon through a support body fixed to a main body cover; wherein the liquid crystal panel is provided with a plurality of protrusions on each of the plurality of side surfaces; the plurality of protrusions each have a flat surface; a plurality of spaces are each provided between the flat surface and the side surface; and the support body is fitted into the spaces formed in the liquid crystal panel.

A recess may be provided in the flat surface so that it is engageable with a protruding portion provided on the support body. The flat surface may be provided with a through hole. The through hole may be a screw hole.

Furthermore, the support body may have a first flat surface and a second flat surface, the first flat surface being fixed to the main body cover of the liquid crystal display unit and the second flat surface being fitted into the spaces formed in the liquid crystal panel. The support body may be formed into an L-shaped structure where the first and second flat surfaces contact each other at nearly right angles. The first flat surface may extend from the second flat surface in an inward direction of the liquid crystal panel.

BRIEF DESCRIPTION OF THE DRAWINGS

Preferred embodiments of the present invention will now be described, by way of example only, with reference to the accompanying drawings in which:

FIG. 3 is an enlarged perspective rear view showing how the support body of FIG. 2 is fitted into the liquid crystal panel of FIG. 2;

FIG. 4 is a perspective view showing the support body fitted into the liquid crystal panel;

DETAILED DESCRIPTION OF THE PREFERRED EMBODIMENTS OF THE INVENTION

Figure 1:
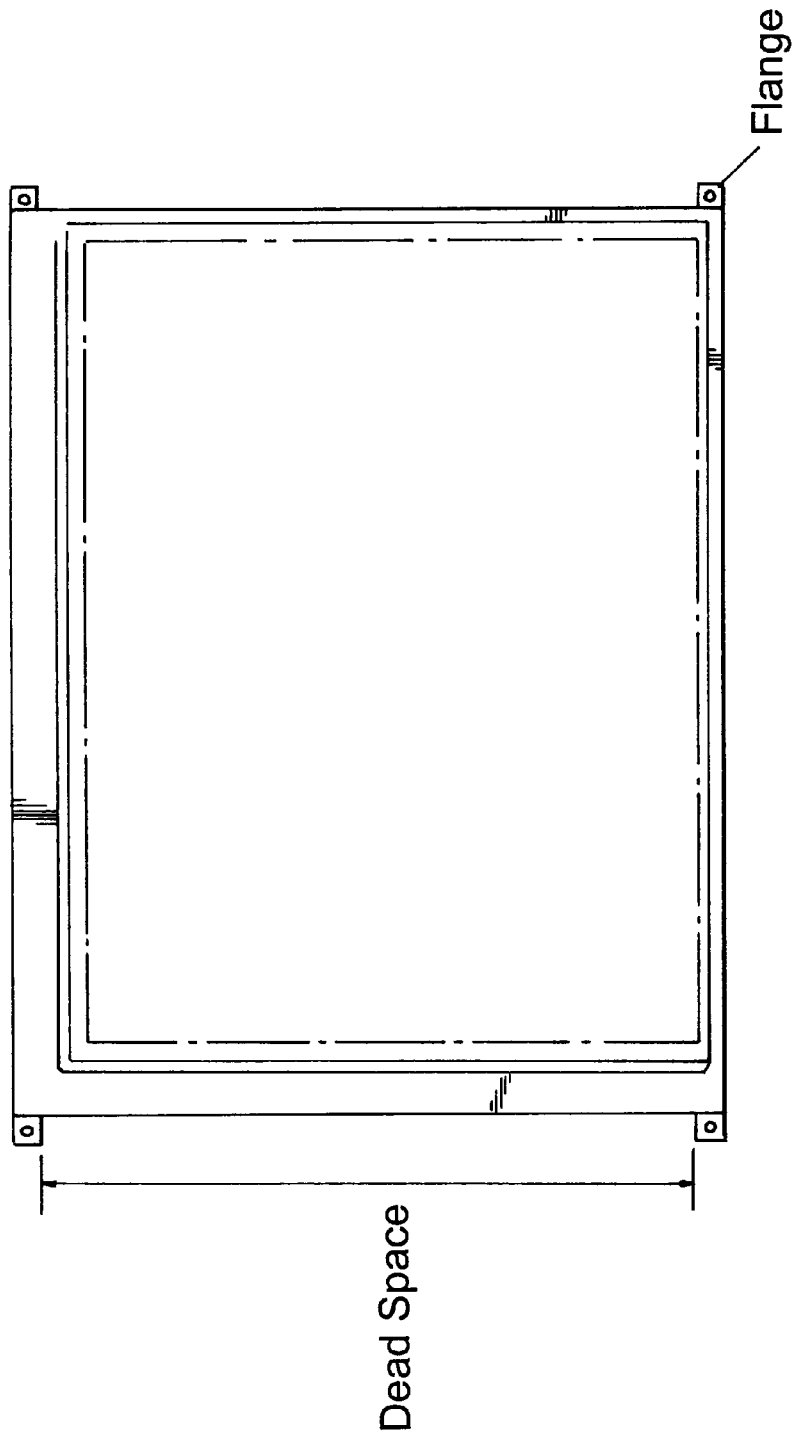
FIG. 1 is a top view showing a liquid crystal panel screwed to a support body by a conventional fixing method.
Figure 2:
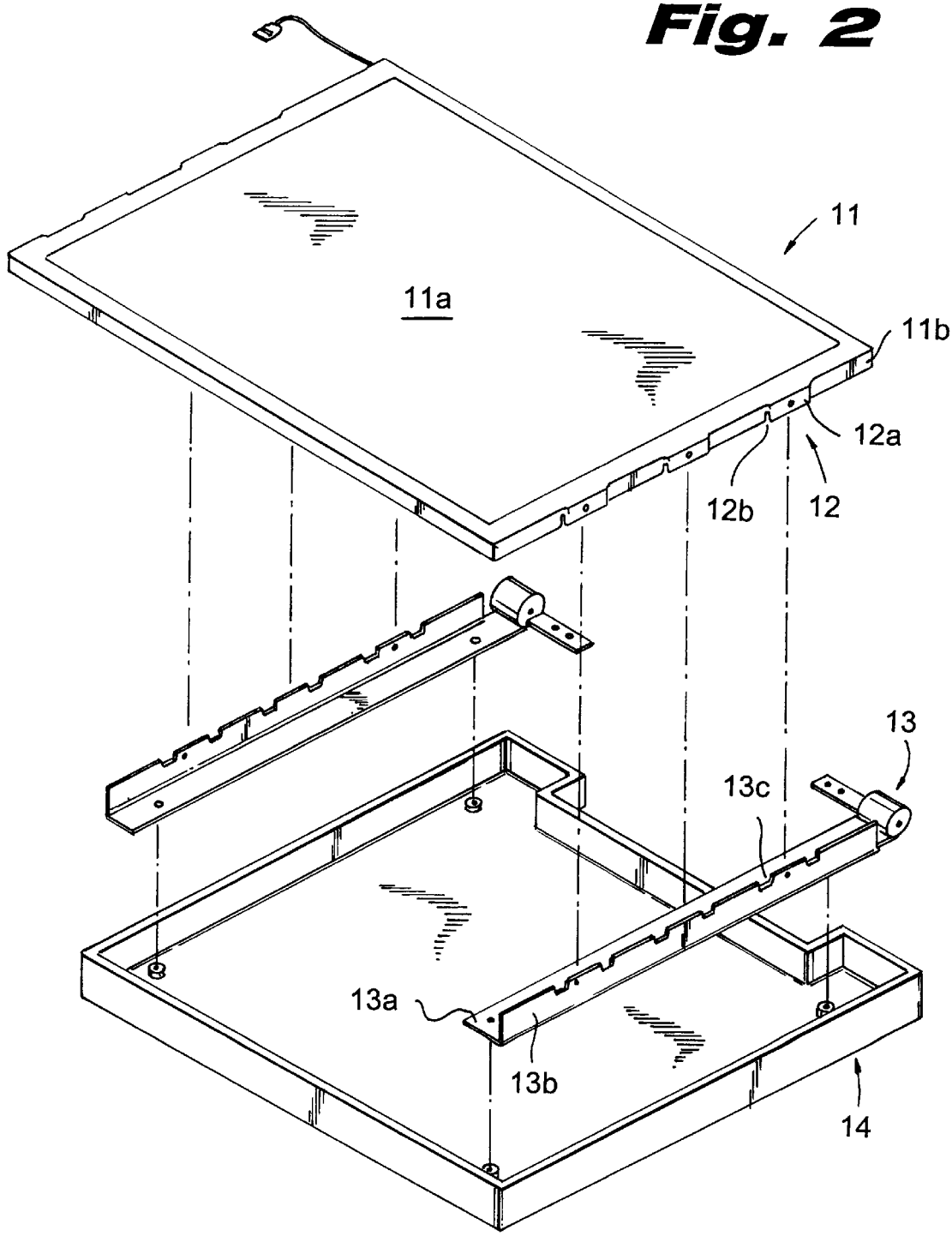
FIG. 2 is an exploded perspective view for prescribing a liquid crystal display unit of an embodiment of the present invention.

FIG. 2 is a perspective view for describing a liquid crystal display unit (for example, PC) of an embodiment of the present invention. A liquid crystal panel 11 has a display portion 11a and up-and-down and right-and-left side surfaces 11b. The right and left side surfaces 11b are each provided with three protrusions 12 extending therefrom. The protrusion 12 has a flat surface 12a, and between this flat surface 12a and the side surface 11b a space 12b is provided. A support body 13 is fixed to a main body cover 14 by means of screws. The support body 13 is constituted by an L-shaped structure comprising a horizontal flat surface 13a and a vertical flat surface 13b. The two surfaces 13a and 13b contact each other at approximately right angles, and the horizontal flat surface 13a extends from the vertical flat surface 13b toward the panel inner side. The support body 13 is fixed to the cover 14 through the horizontal flat surface 13a and to the liquid crystal panel 11 through the vertical flat surface 13b. In this embodiment, while the support body 13 and the main body cover 14 are separately formed, they may be integrally formed as a main body cover. The vertical flat surface 13b of the support body 13 has a plurality of grooves 13c at predetermined positions on the upper edge thereof.

FIG. 3 is an enlarged perspective rear view showing how the support body is fitted into the liquid crystal panel. FIG. 4 is a perspective view showing the support body fitted into the liquid crystal panel. The groove 13c of the support body 13 is fitted into the space 12b between the protrusion 12 and the side surface 11b of the liquid crystal panel 11 and engages the liquid crystal panel 11. Thus, the groove 13c of the support body 13 serves as a means of limiting movement of the support body 13 in an x direction shown in FIG. 3. In addition, since the vertical flat surface 13b of the support body 13 and the side surface 11b of the liquid crystal panel 11 are in surface contact with each other, the mechanical fixing strength between the support body 13 and the liquid crystal panel 11 is high in y and z directions.

Figure 5:
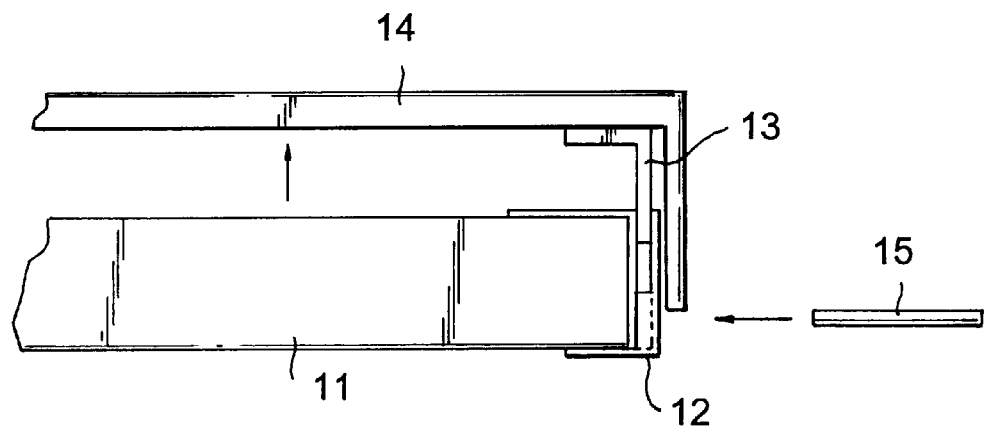
FIG. 5 is a sectional view showing a first embodiment for fixing the liquid crystal panel to the main body cover.
Figure 5A:
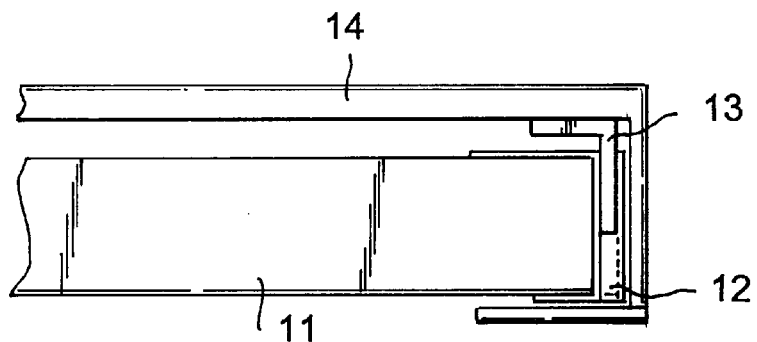

Furthermore, the flat surface 12a of the protrusion 12 of the liquid crystal panel 11 is provided with a screw hole 12d which is a through hole. The screw hole 12d is provided at a position which is aligned with the screw hole 13d of the support body 13 when the liquid crystal panel 11 engages the support body 13. FIG. 5 is a sectional view showing a first embodiment for fixing the liquid crystal panel to the main body cover. A stop pin or screw 15 is inserted through the screw holes 12d and 13d, thereby fixing the liquid crystal panel 11 to the main body cover 14. The stop pin or screw 15 limits movement of the liquid crystal panel 11 in a z direction, and more firmly regulates the movement in the x direction by the engagement between the space 12b and the groove 13c.

Thus, the liquid crystal panel 11 and the main body cover 14 are fixed together by utilizing the aforementioned engagement as well as screws or stop pins. Therefore, as compared with the case where only screws are utilized, mechanical fixing strength is increased and also the load caused by employing screws is dispersed over the entire surface of the protrusion. Therefore, even firmer fixation of the liquid crystal panel is achieved compared with the aforementioned conventional methods.

Also, according to this embodiment, it becomes possible to reduce dead space compared with the aforementioned conventional methods. In the aforementioned conventional method, screws are inserted into screw holes formed directly in the side surfaces of the liquid panel, and consequently, the spaces for screw holes must be ensured interiorly of the panel. However, in this embodiment of the present invention, the screw hole 12d of the liquid crystal panel 12 is not provided directly in the side wall 11b of the liquid panel 11 but is provided in the flat surface 12a of the protrusion 12 protruding from the side wall 11b. Since the space for inserting a screw is ensured between the protrusion 12 and the side wall 11b, there is no need to ensure space interiorly of the liquid crystal panel.

Figure 6:
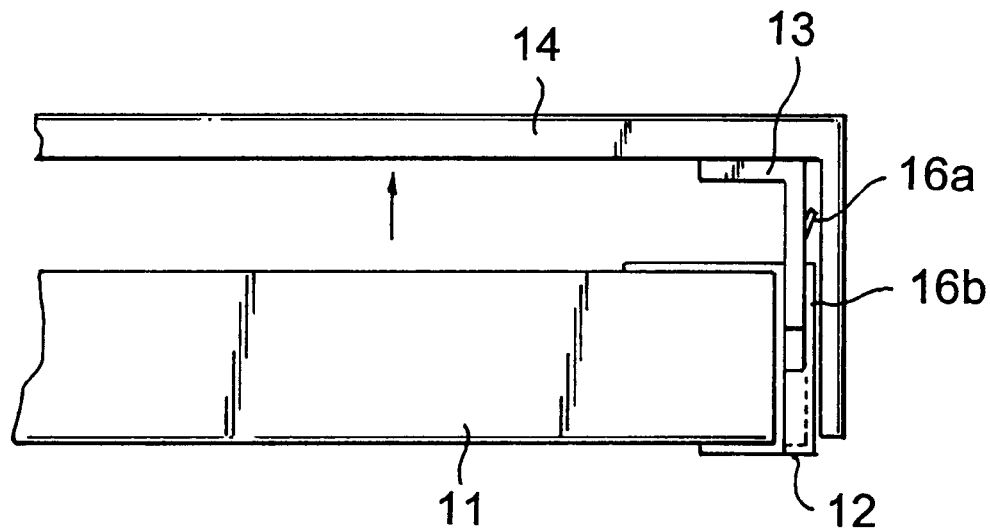
FIG. 6 is a sectional view showing a second embodiment for fixing the liquid crystal panel to the main body cover.
Figure 6A:
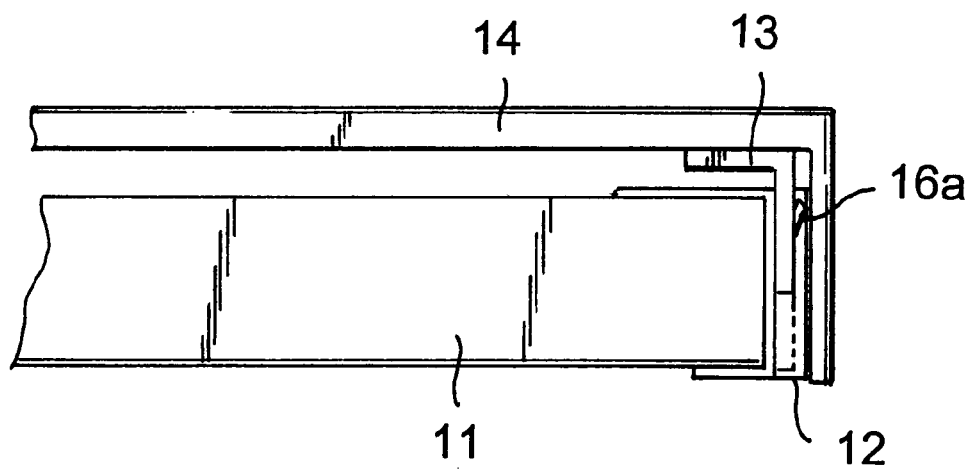

FIG. 6 is a sectional view showing a second embodiment for fixing the liquid crystal panel to the main body cover. In this embodiment, a latch is utilized to fix the liquid crystal panel. That is, a protruding latch (protrusion) 16a is provided on the support body 13, and a recess 16b for receiving the latch is provided in the flat surface 12a of the protrusion 12. If the latch is employed in this way, the liquid crystal panel can be reliably fixed without employing other components such as screws.

Figure 7:
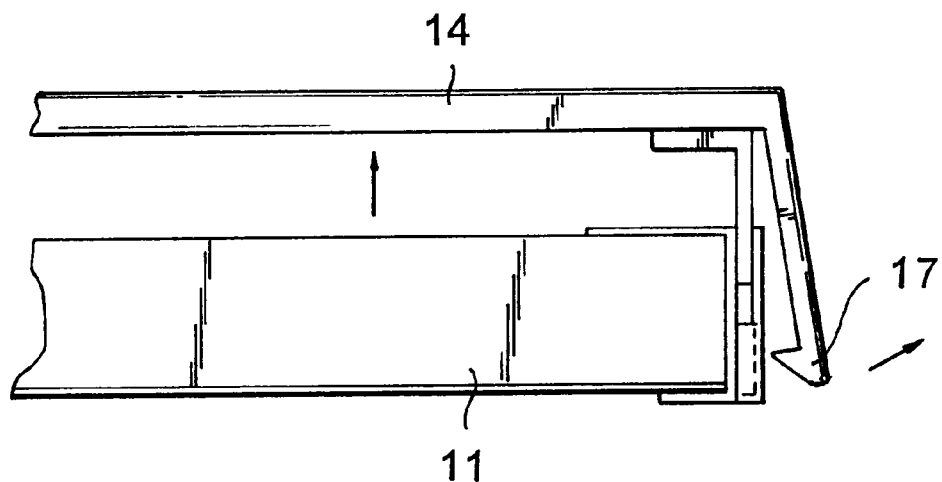
FIG. 7 is a sectional view showing a third embodiment for fixing the liquid crystal panel to the main body cover.
Figure 7A:
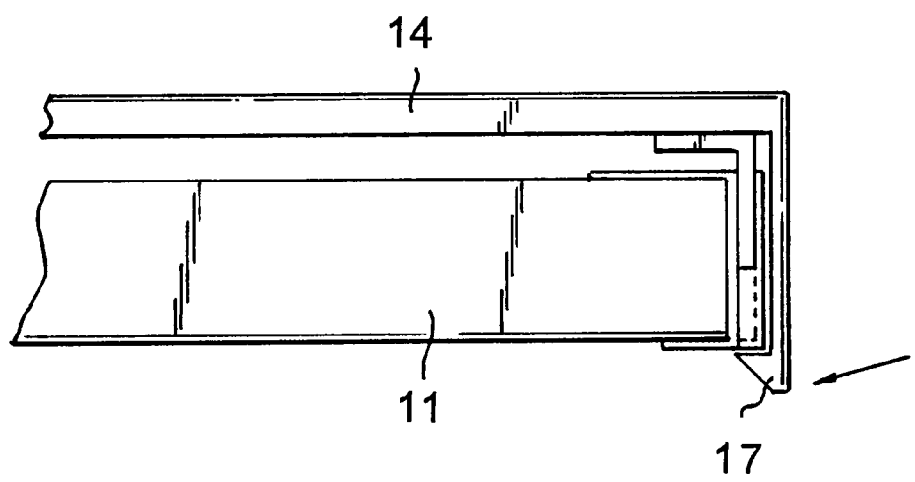

FIG. 7 is a sectional view showing a third embodiment for fixing the liquid crystal panel to the main body cover. In this embodiment, a latch 17 is provided on the end portion of the main body cover for fixing the liquid crystal panel to the main body cover.

Thus, in the present invention, the liquid crystal panel is fixed to the liquid crystal unit by making use of the engagement between the protrusion with a space provided on the side surface of the liquid crystal panel and the recess formed in the support body. Therefore, it is possible to increase mechanical fixing strength compared with the aforementioned conventional fixing method using only screws. In addition, the space required for fixation can be reduced.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A liquid crystal panel having a fixing mechanism, the liquid crystal panel comprising:

a display portion having a plurality of side surfaces along a perimeter of said display portion;

said plurality of side surfaces each including a protruded portion and a non-protruded portion;

said protruded portion having a flat surface; and a slit formed between said protruded portion and said non-protruded portion.

2. The liquid crystal panel as claimed in claim 1, wherein said protruded portion comprises a plurality of protruded portions for one or more of said side surfaces.

3. The liquid crystal panel as claimed in claim 1, wherein said protruded portion is formed integrally with said side surface.

4. A liquid crystal panel comprising:

a display portion; and a plurality of side surfaces along a perimeter of said display portion, said plurality of side surfaces each having a protrusion;

wherein said protrusion has a flat surface and a space is provided between said flat surface and the side surface, and wherein said flat surface of said protrusion has a recess.

5. The liquid crystal panel as set forth in claim 4, wherein said recess is a through hole.

6. The liquid crystal panel as set forth in claim 5, wherein said through hole is a screw hole.

7. A liquid crystal display unit comprising:

a liquid crystal panel with a display portion and a plurality of side surfaces mounted thereon through a support body fixed to a main body cover;

wherein: said liquid crystal panel is provided with a plurality of protrusions on each of said plurality of side surfaces;

said plurality of protrusions each have a flat surface;

a plurality of spaces are each provided between said flat surface and said side surface; and said support body is fitted into said spaces formed in said liquid crystal panel.

8. The liquid crystal display unit as set forth in claim 7, wherein a recess is provided in said flat surface so that it is engageable with a protruding portion provided on said support body.

9. The liquid crystal display unit as set forth in claim 7, wherein said flat surface is provided with a through hole.

10. The liquid crystal display unit as set forth in claim 9, wherein said through hole is a screw hole.

11. The liquid crystal display unit as set forth in claim 7, wherein said support body has a first flat surface and a second flat surface, the first flat surface being fixed to said main body cover of said liquid crystal display unit and the second flat surface being fitted into said spaces formed in said liquid crystal panel.

12. The liquid crystal display unit as set forth in claim 11, wherein said support body is formed into an L-shaped structure where said first and second flat surfaces contact each other at nearly right angles.

13. The liquid crystal display unit as set forth in claim 10, wherein said first flat surface extends from said second flat surface in an inward direction of said liquid crystal panel.

\* \* \* \* \*